(No Model.)

G. W. BUFFORD & J. E. KITSON.
PIPE WRENCH.

No. 489,455. Patented Jan. 10, 1893.

Witnesses:—
D. N. Hayward
O. Sundgren

Inventors:—
George W. Bufford
John E. Kitson
by attorneys
Brown & Seward

UNITED STATES PATENT OFFICE.

GEORGE W. BUFFORD AND JOHN E. KITSON, OF ITHACA, NEW YORK.

PIPE-WRENCH.

SPECIFICATION forming part of Letters Patent No. 489,455, dated January 10, 1893.

Application filed April 21, 1892. Serial No. 429,994. (No model.)

*To all whom it may concern:*

Be it known that we, GEORGE W. BUFFORD and JOHN E. KITSON, both of Ithaca, in the county of Tompkins and State of New York, have invented a new and useful Improvement in Pipe-Wrenches, of which the following is a specification.

Our invention relates to an improvement in pipe wrenches in which an adjustable jaw is permitted to tilt relatively to the stationary jaw in order to tighten the grip after the wrench is engaged with the pipe.

Figure 1:
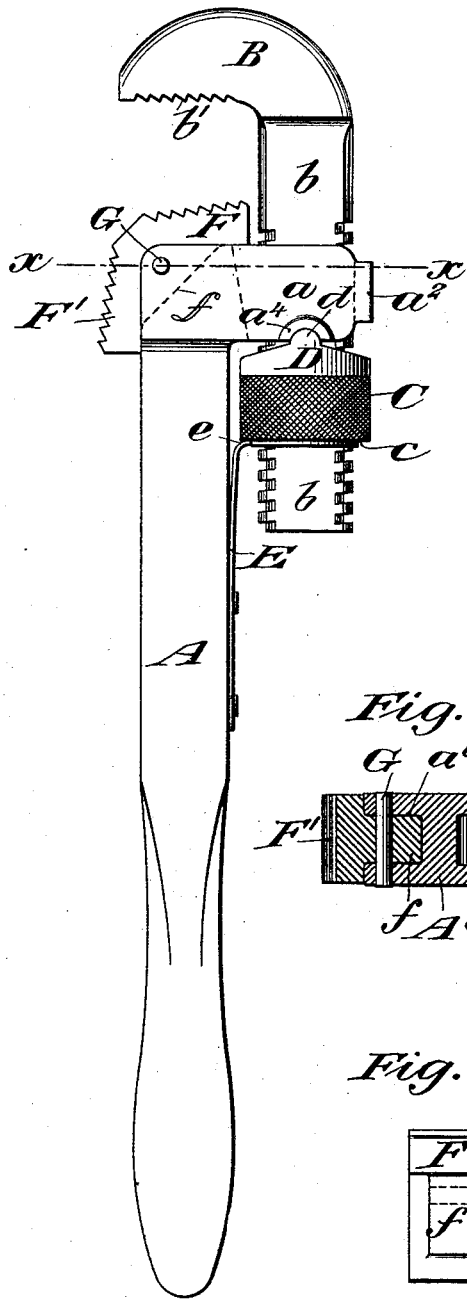
Figure 2:
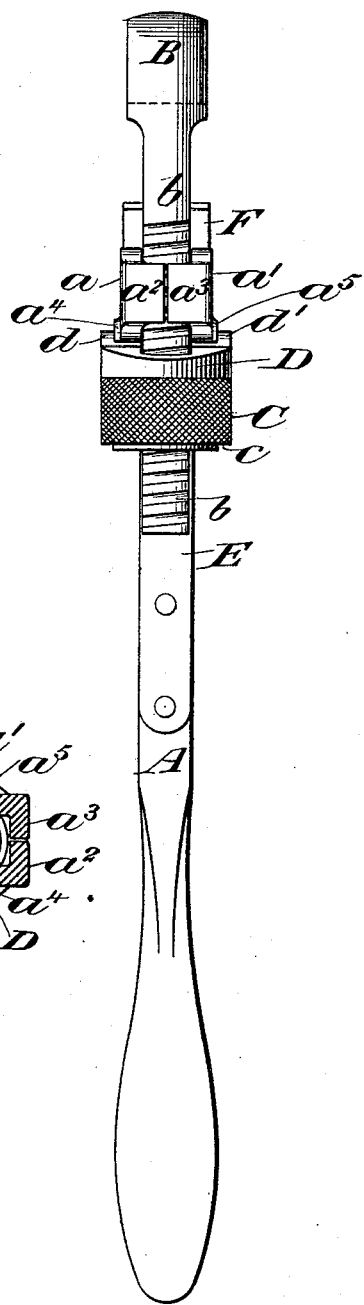
Figure 3:
Figure 4:
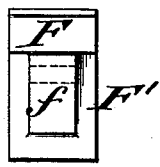

A practical embodiment of our invention is represented in the accompanying drawings in which Figure 1 is a view of the wrench in side elevation, Fig. 2 is a rear view, Fig. 3 is a transverse section on line $x$, $x$ of Fig. 1, Fig. 4 is a rear view in detail of the detachable, reversible, stationary jaw.

The handle is represented by A and at its end where the jaws are attached we have shown it bifurcated and its branches $a$, $a'$ offset at substantially right angles with the handle to receive between them the screw threaded shank $b$ of the adjustable jaw B. To complete the housing for the said shank $b$ we have shown the ends of the branches $a$, $a'$ turned over toward each other and brought into proximity to each other at the back of the shank $b$. as shown at $a^2$ and $a^3$. The jaw B is set with its biting face substantially at right angles to the shank B and is provided with teeth $b'$. as is usual. The screw thread upon the shank $b$ is preferably interrupted by narrowing the shank in one direction, leaving it wider in the opposite direction or in the direction of its strain.

A thumb nut C for adjusting the jaw B away from and toward the stationary jaw is provided with an internal thread adapted to register with the interrupted screw thread upon the shank $b$ and said thumb nut is seated upon the threaded portion of the shank $b$ at a point below the branches $a$, $a'$ of the handle. A ring bearing D, presenting a flat face toward the end of the nut C, is provided with a pair of rounded lugs or half trunnions $d$ and $d'$ adapted to seat and rock within bearings $a^4$ and $a^5$ provided for them in the edges of the branches $a$ and $a'$, so as to permit the bearing ring D to rock in a plane passing through the wrench from front to rear. The bearings $a^4$ and $a^5$ are located upon opposite sides of the shank $b$ so that the axis about which the bearing ring D rocks will pass through the shank $b$. The adjusting nut C is provided on its under side with an annular recess $c$ conveniently formed by rabbeting its corner, and within said recess $c$ the free end of a spring E is adapted to rest. The shank of the spring E is firmly secured to the handle A and its free end $e$ is formed on a curve so that its extreme end will bear against the wall of the recess $c$ which extends in the direction of the axis of the nut, while its rounded portion will bear against the adjacent wall of said recess. The spring E is employed as a stop to hold the nut in contact with the bearing ring D and the latter in its seat and consequently tends to hold the jaw B engaged with the nut C in elevated adjustment. The tension of the spring E is so regulated that when in its normal position, as shown in Fig. 1, it will admit of the jaw B being rocked backwardly a short distance and thereby open it somewhat away from the stationary jaw but its tension will tend to immediately throw the end of the jaw B back into its normal position when the said jaw is released. On the other hand, the said spring will also permit the jaw B to be swung forwardly to close the space between it and the lower jaw but when released the tension of the spring will also, by its bearing against another wall of the recess $c$, tend to throw the jaw B back again into its normal position. It will therefore be observed that the functions of the spring E are three fold viz., as a stop to hold the adjustable jaw and its adjusting nut and bearing ring in elevated adjustment and also to return the adjustable jaw B to its normal position when, for any cause, it has been thrown either backward or forward out of such normal position.

The stationary jaw is made reversible and consists of the sections F and F' seated at an angle of ninety degrees more or less, to each other and connected by a web $f$ which is adapted to rest within a recess $a^6$ formed at an angle where the branches $a$, $a'$ are turned from the handle A. The said stationary jaw may be held in position by a pin G inserted through the handle A and through the web $f$. When from any cause the part F becomes when so as to render it ineffective, the part F' may be substituted for it by simply removing the pin G and reversing the stationary jaw, placing the part F' where the part F formerly was and again inserting the pin G.

It will be observed that the strain upon the stationary jaw will be exerted against the end of the handle A in a direction more or less longitudinally thereof and hence there will be no considerable strain upon the pin G, as it will be transmitted through the web $f$ and under side of the jaws F, F' directly to the handle.

It will further be observed that the strain upon the tilting jaw B will be transferred from the screw threaded portion of the shank to the nut C and by it to the entire face of rocking bearing D no matter what may be the rocked position of said bearing and that by said bearing D it will be transferred to the under edges of the branches $a$ and $a'$ and hence their entire depth will be utilized for strength.

What we claim is:

1. In combination, a handle provided with a stationary jaw, an adjustable jaw secured to the handle, a rocking bearing exterior to the handle and surrounding the shank of the adjustable jaw, the said rocking bearing having a rocking movement about the axis passing transversely through the shank of the adjustable jaw, an adjusting nut engaged at its end with said surrounding rocking bearing, and a stop for holding the adjustable jaw in position, substantially as set forth.

2. In combination, a handle provided with a stationary jaw, an adjustable jaw secured to the handle, a rocking bearing, an adjusting nut engaged with the adjustable jaw and with the rocking bearing, the said adjusting nut being provided with an annular recess and a spring secured to the handle and having its free end engaged with the adjacent walls of said recess, said spring forming a stop to hold the parts in position and to return the adjustable jaw from its tilting movement in either direction back to its normal position, substantially as set forth.

3. In combination, a handle having its end bifurcated and its branches offset from the handle and their ends turned toward each other to form a socket for the reception of the shank of the adjustable jaw and provided with a recess for the reception of the web of the stationary jaw, an adjustable jaw within said offset branches, a reversible, stationary jaw seated within said recess and means for adjusting the adjustable jaw and for holding it in its adjustment, substantially as set forth.

GEORGE W. BUFFORD.
JOHN E. KITSON.

Witnesses:
H. P. JOHNSON,
G. W. SLOCUM.